Patented Dec. 3, 1935

2,023,142

UNITED STATES PATENT OFFICE 2,023,142

MOTOR FUEL OF HIGH ANTIKNOCK VALUE

Nicolaas Max, Amsterdam, Netherlands, assignor to Shell Development Company, San Francisco, Calif., a corporation of Delaware No Drawing. Application September 14, 1932, Serial No. 633,079. In the Netherlands September 22, 1931

10 Claims. (Cl. 44—9)

The invention relates to a process for the production of motor fuels of high anti-knock value.

It is known to improve the anti-knock value of motor fuels by the addition of a great many substances which are volatile at the working temperature of the engine, i. e. organic compounds of various metals and metalloids.

According to the invention motor fuels of high anti-knock value are produced by adding to the fuel, for example gasoline and similar fuels for ignition motors, metal compounds of the condensation products of compounds which besides one carbonyl group contain one or more of oxygen-containing radicals in the molecule with amines. Thus, to the motor fuel may be added heavy metal salts of the condensation products of oxy-aldehydes, di-ketones, tri-ketones and the like with primary amines. The components of the condensation product may be of an aliphatic as well as of an aromatic nature.

The metal compounds which are primarily suitable are, generally speaking, those heavy metal salts the metals of which can form with ammonia complex compounds such as copper-, nickel-, cobalt-, zinc-, chromium- and similar salts.

Of the known substances hitherto used as antiknock media the metal salts of β di-ketones come nearest in composition to the substances according to the invention. A drawback of using these metal salts as anti-knock media lies in their low solubility in benzines which contain few aromatic hydrocarbons. For this reason it has been endeavoured to increase the solubility by the addition of aromatic hydrocarbons, alcohols and the like. The compounds used according to the invention are more soluble in benzine even if this benzine contains comparatively small amounts of aromatic hydrocarbons.

The following examples of compounds to be used may i. e. be mentioned: the copper-, nickel- and cobalt compounds of salicylal-allylamine, salicylalmethylamine, β naphtholal-allylamine, protocatechual-ethylamine and the condensation product of allylamine and acetyl acetone, etc.

The following are a few methods of preparing these compounds:

(a) *Production of salicylal-allylamine copper*

5.7 g. allylamine is added to 12.2 g. salicylaldehyde whilst shaking. With a strong development of heat water separates off and a heavy yellow oil of intensive light-refracting property is obtained, which is only to a small extent soluble in water and becomes very intensively red with an FeCl₃ solution. This oil, when dissolved in methyl alcohol, gives with an equivalent quantity of copper acetate in a concentrated aqueous solution a precipitate of salicylal-allylamine copper which is at first oily but subsequently crystallizes. The compound itself forms good dark green needles which can be dissolved in practically all organic solvents; melting point 114–116° C., Cu-content according to analysis 15.0%, theoretically for $C_{20}H_{20}N_2O_2Cu$ 15.3%.

(b) *Production of O—β naphtholal-methylamine copper*

According to the Gattermann method the hydrochloric acid imino-ether of the oxaldehyde is prepared from β-naphthol with hydrocyanic acid and HCl in an absolutely etheric solution, from which, by boiling with water, the O—β naphtholaldehyde is obtained. Methylamine gas is introduced into a methylalcoholic solution of this aldehyde, resulting in the production of the O—β naphtholal-methylamine. From this the copper compound is obtained with copper acetate in the manner described under (a).

It appears that at least a portion of condensation products, which result from reactions of primary alkyl amines with alkyl and/or aryl keto- and/or aldo-compounds having one or more substituted oxygen atoms in their molecules besides at least one carbonyl group, may be represented by the formula:

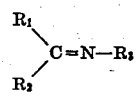

in which R₁ represents either an alkyl grouping or a hydrogen atom, R₂ designates a hydrocarbon grouping directly linked to at least one hydroxyl or carbonyl group other than that contained in a carboxylic acid, and R₃ is an alkyl grouping.

Correspondingly, the heavy metal compounds used according to this invention apparently may be represented by the following formula:

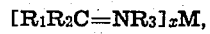

wherein M represents a heavy metal and $x$ corresponds to the valence of the metal.

The following examples illustrate the process according to the invention:

*Example I*

To a benzine with which was admixed 5% benzol and having a Ricardo variable compression engine H. U. C. of 5.40, 0.05% copper in the form of salicylal-methylamine-copper was added, a H. U. C. of 6.45 thus being obtained.

Example II

To a benzine with which was admixed 10% benzol and having a H. U. C. of 5.46, 0.06% cobalt in the form of salicylal-allylamine-cobalt was added, a H. U. C. of 6.48 thus being obtained.

Example III

To a benzine having a H. U. C. of 5.47, 0.02% copper was added in the form of salicylal-allylamine-copper, a H. U. C. of 5.72 thus being obtained.

Besides the above metal compounds other substances, such as compounds preventing deposition of metal on the valves of the engine and/or other anti-knock media may be simultaneously added to the motor fuel.

What I claim is:

1. A gasoline type motor fuel comprising a substantial proportion of a hydrocarbon fuel mixture containing a small quantity of a heavy metal compound of the compound having the structural formula:

wherein $R_1$ represents an alkyl grouping or hydrogen, $R_2$ designates a hydrocarbon grouping directly linked to at least one hydroxyl group other than that contained in a carboxylic acid, and $R_3$ is an alkyl grouping, said heavy metal being capable of forming a complex compound with ammonia.

2. A gasoline type motor fuel comprising a substantial proportion of a hydrocarbon fuel mixture containing a small quantity of a heavy metal compound of the compound having the structural formula:

wherein $R_1$ represents an alkyl grouping or hydrogen, $R_2$ designates a hydrocarbon grouping directly linked to at least one hydroxyl or carbonyl group other than that contained in a carboxylic acid, and $R_3$ is an aliphatic radical, said heavy metal being capable of forming a complex compound with ammonia.

3. A gasoline type motor fuel comprising a substantial proportion of a hydrocarbon fuel mixture containing a small quantity of a heavy metal compound of the compound having the structural formula:

wherein $R_1$ represents an alkyl grouping or hydrogen, $R_2$ designates a hydrocarbon grouping linked to at least one keto group, and $R_3$ is an alkyl grouping, said heavy metal being capable of forming a complex compound with ammonia.

4. A gasoline type motor fuel comprising a substantial proportion of a hydrocarbon fuel mixture containing a small quantity of a heavy metal compound of the compound having the structural formula:

wherein $R_1$ represents H, $R_2$ designates

and $R_3$ is an alkyl or aryl grouping, said heavy metal being capable of forming a complex compound with ammonia.

5. A gasoline type motor fuel comprising a substantial proportion of a hydrocarbon fuel mixture containing a small quantity of a heavy metal compound of the compound having the structural formula:

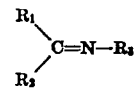

wherein $R_1$ represents H, $R_2$ designates

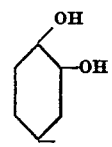

and $R_3$ is an alkyl grouping, said heavy metal being capable of forming a complex compound with ammonia.

6. A gasoline type motor fuel comprising a substantial proportion of a hydrocarbon fuel mixture containing a small quantity of a heavy metal compound of the compound having the structural formula:

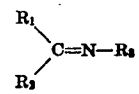

wherein $R_1$ represents $CH_3$ and $R_2$ designates

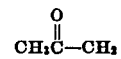

and $R_3$ is an alkyl grouping, said heavy metal being capable of forming a complex compound with ammonia.

7. A gasoline type motor fuel comprising a substantial proportion of a hydrocarbon fuel mixture containing a small quantity of a heavy metal compound of salicylal-allylamine, said heavy metal being capable of forming a complex compound with ammonia.

8. A gasoline type motor fuel comprising a substantial proportion of a hydrocarbon fuel mixture containing a small quantity of a copper compound of salicylal-allylamine.

9. A gasoline type motor fuel comprising a substantial proportion of a hydrocarbon fuel mixture containing a small quantity of a heavy metal compound of protocatechual-ethylamine, said heavy metal being capable of forming a complex compound with ammonia.

10. A gasoline type motor fuel comprising a substantial proportion of a hydrocarbon fuel mixture containing a small quantity of a heavy metal compound of acetylacetylacetone allylamine, said heavy metal being capable of forming a complex compound with ammonia.

NICOLAAS MAX.